May 29, 1951 — F. H. BENGE — 2,555,109
PREFORMING APPARATUS
Filed Jan. 10, 1949 — 4 Sheets-Sheet 1
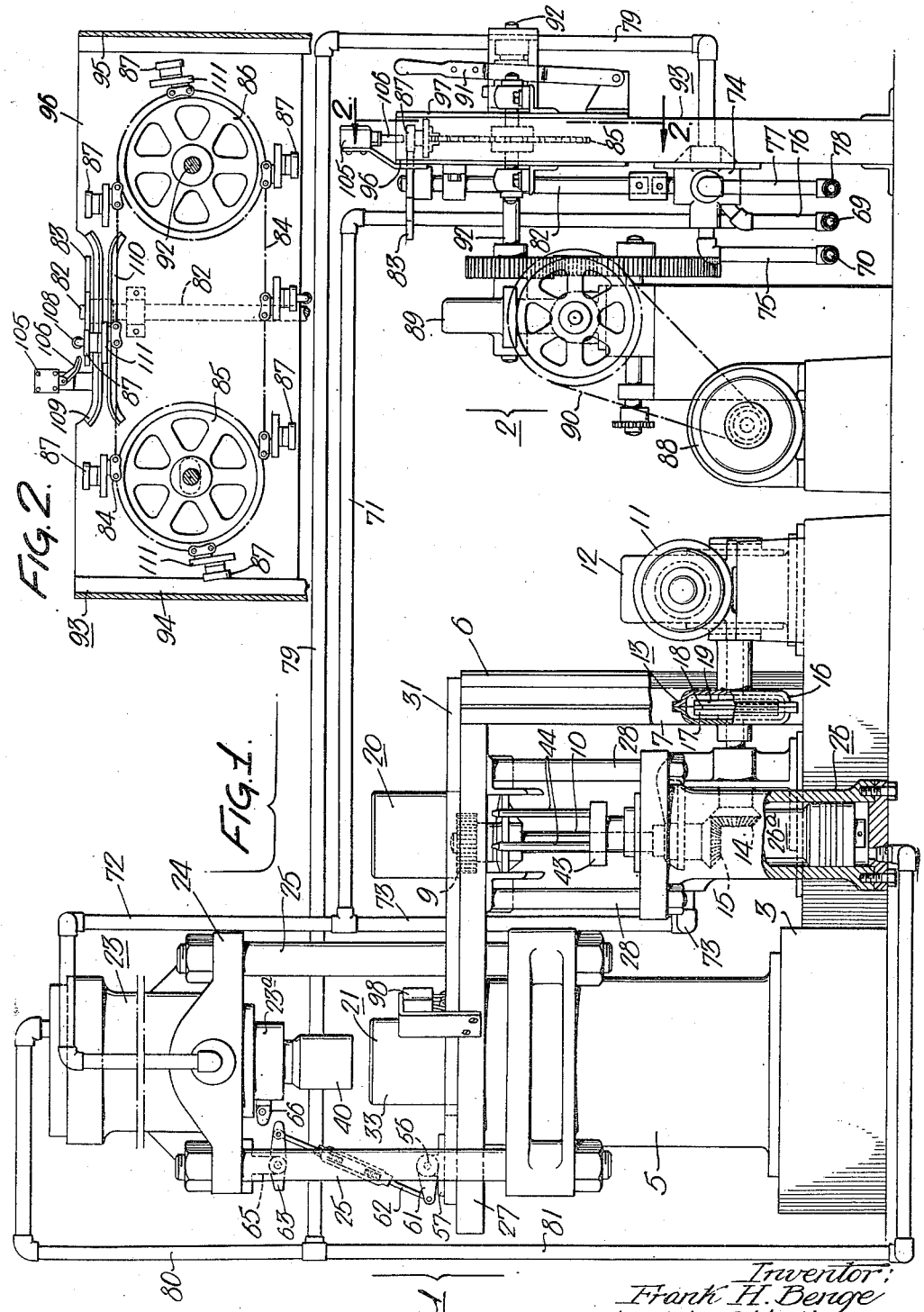
Inventor:
Frank H. Benge
by his Attorneys
Howson & Howson May 29, 1951  F. H. BENGE  2,555,109
PREFORMING APPARATUS
Filed Jan. 10, 1949  4 Sheets-Sheet 2
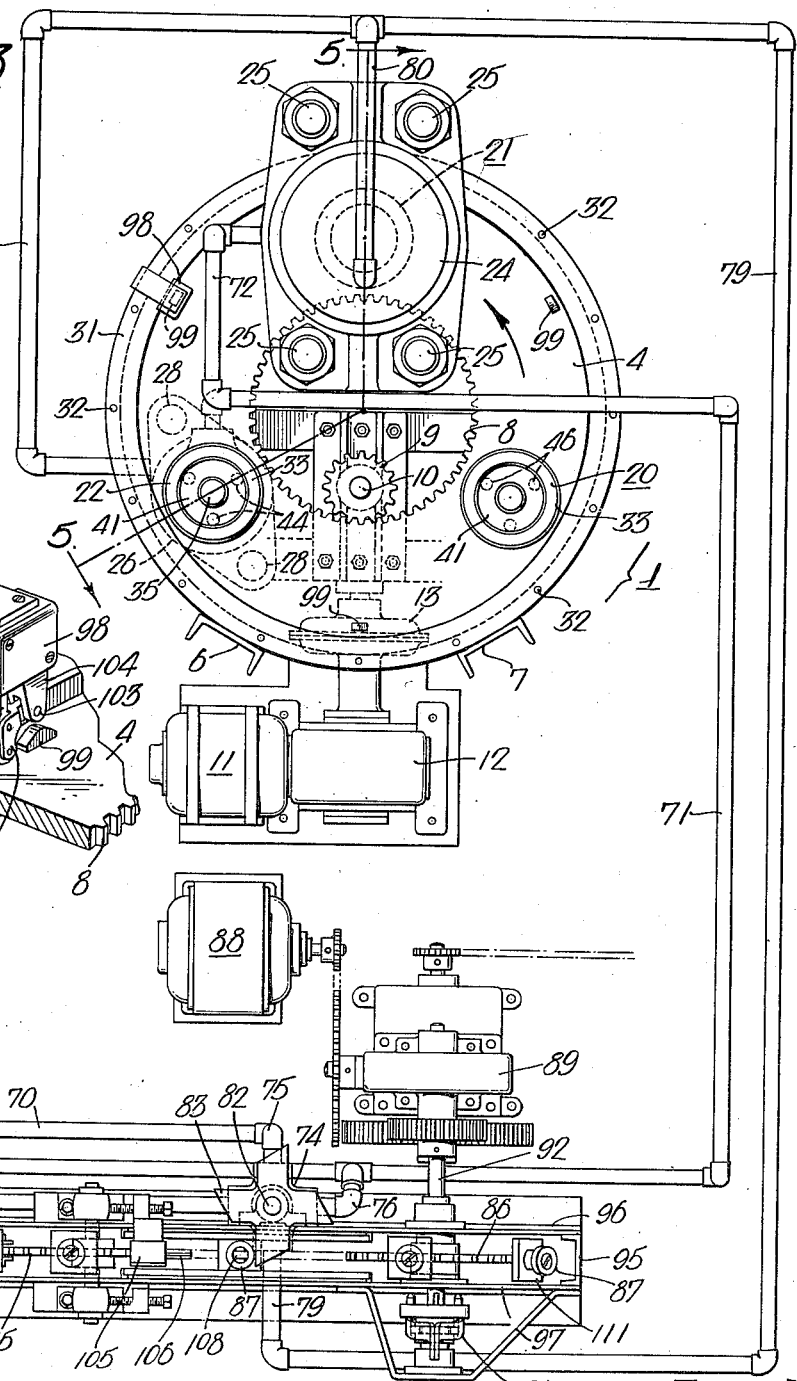

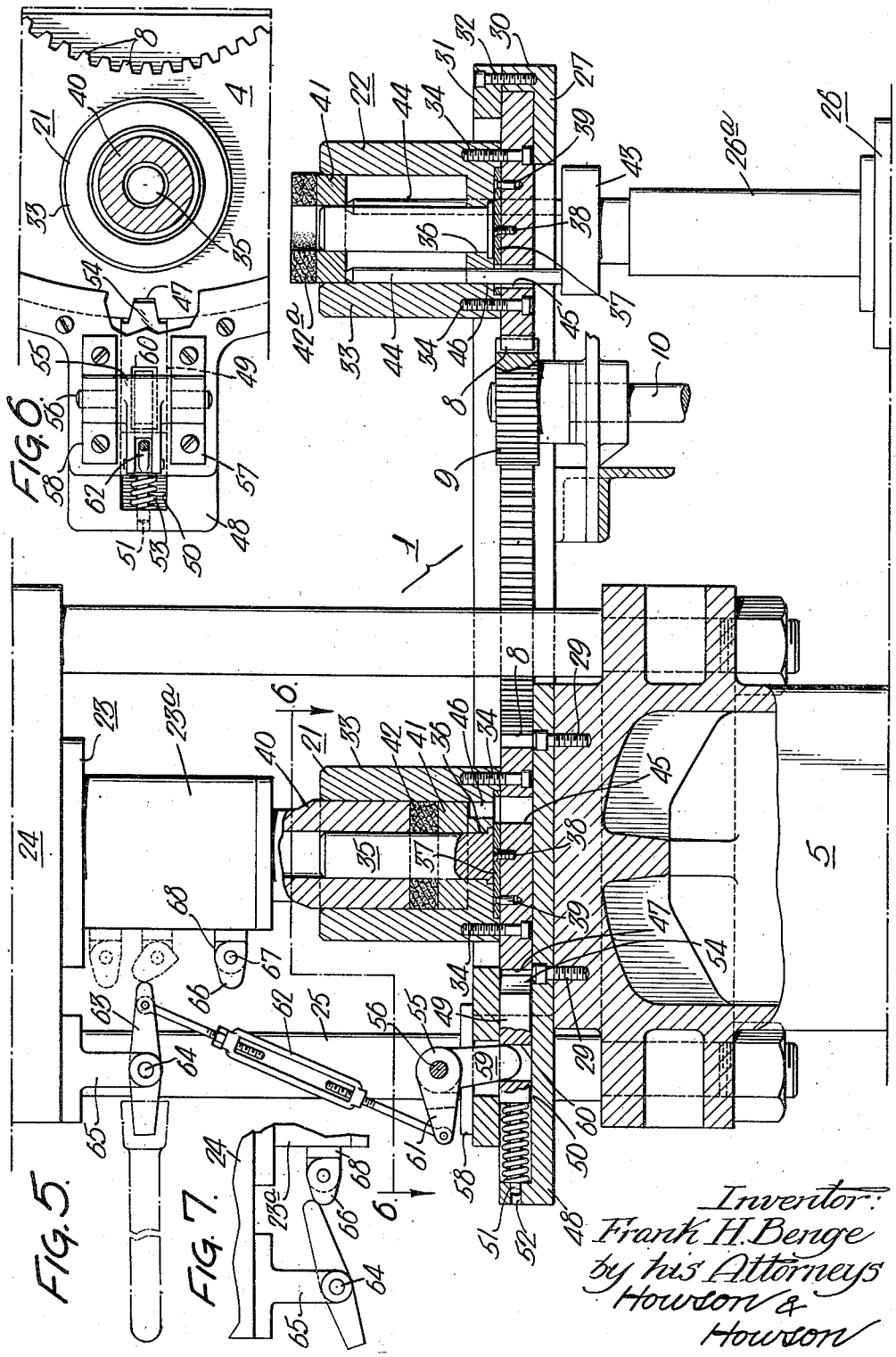

May 29, 1951  F. H. BENGE  2,555,109
PREFORMING APPARATUS
Filed Jan. 10, 1949  4 Sheets-Sheet 4

Inventor:
Frank H. Benge
by his Attorneys
Howson & Howson

Patented May 29, 1951

2,555,109

UNITED STATES PATENT OFFICE 2,555,109

PREFORMING APPARATUS

Frank H. Benge, Norristown, Pa., assignor to Continental-Diamond Fibre Company, Newark, Del., a corporation of Delaware Application January 10, 1949, Serial No. 70,035

15 Claims. (Cl. 18—20)

This invention relates to apparatus for preforming objects of moldable material to the end that such objects may be readily molded later to final form. The invention further relates to apparatus which is capable of preforming objects of macerated resin-impregnated or coated fibrous material such as is used in the manufacture of gear blanks and other products. While the invention is capable of general application, it is intended especially for application to the manufacture of gear blanks, and it will be so described.

In the manufacture of certain gear blanks, the web portion may be formed of macerated resin-impregnated material and the rim portion may be formed of laminated resin-impregnated fibrous material. A metal hub member is located centrally of the web portion for mounting the gear on a rotatable member such as a shaft. In manufacturing the gear blank, it is necessary to mold the web and rim portions together and to mold the web portion about the metal hub member, thus forming the composite gear blank. It is a relatively simple matter to preform the laminated rim portion and to place the preform in a mold for the final molding operation. However, the web portion has presented a substantial problem particularly since the macerated resin-impregnated fibrous material is very bulky and does not lend itself to preforming. The material employed in the web portion is usually a cotton fabric impregnated or coated with phenol formaldehyde resin. In the past, the manufacture of such gear blanks has been time consuming and costly due to the difficulty in handling and working the macerated material. Yet the use of such material in the web portion is greatly to be desired as it enables the use of scrap material and reduces the material cost.

Prior to the present invention, there was no available apparatus capable of preforming the web portion of such a gear blank. Not only did the bulkiness of the macerated material present a problem, but the necessity of making the preform in the shape of a ring or annulus to accommodate the metal hub member also added to the difficulty.

The principal object of the present invention is to provide an apparatus which is capable of rapidly preforming objects of moldable material, and more particularly to provide an apparatus which is capable of rapidly preforming gear web portions of macerated resin-impregnated fibrous material.

By the use of the apparatus provided by this invention, the cost of manufacture of gear blanks is greatly reduced and the rate of production is greatly increased. Thus, it is now possible to preform both the web portion and the rim portion of a gear blank, and to assemble the preforms in a mold together with the metal hub member.

The apparatus of the present invention produces the web preforms at a rapid rate and it requires only one operator. This apparatus has been constructed and tested on a mass production basis and has fully demonstrated its capabilities.

The invention may be fully understood by reference to the accompanying drawings wherein a preferred embodiment of the apparatus is illustrated.

In the drawings:

Fig. 1 is an elevational view of the apparatus;

Fig. 2 is a sectional view taken along line 2—2 of Fig. 1;

Fig. 3 is a plan view of the apparatus;

Fig. 4 is a fragmentary perspective view illustrating one of the controlling switches employed;

Fig. 5 is a relatively large scale sectional view taken along line 5—5 of Fig. 3;

Fig. 6 is a sectional view taken along line 6—6 of Fig. 5;

Fig. 7 is a detail view of a part of the operating mechanism;

Figure 8:
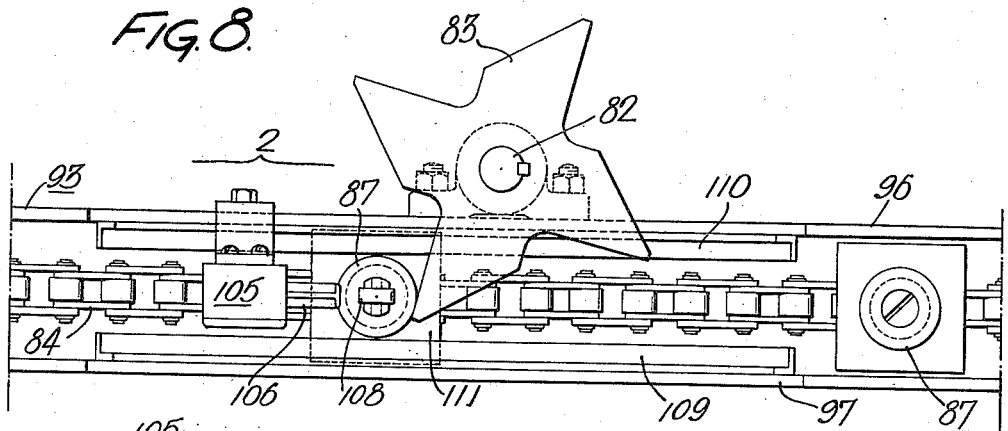
Fig. 8 is a relatively large scale plan view of a portion of the timing control mechanism.

Referring first to Figs. 1 and 3, there are provided by this invention a preforming mechanism designated generally by reference character 1 and a timing control mechanism designated generally by reference character 2. A bed plate 3 serves to support the various parts or elements of the preforming mechanism. This mechanism includes a turntable 4 which is rotatably supported on vertical standards or support members 5, 6 and 7 which extend upwardly from the bed plate 3. The turntable 4 is preferably of annular form and has gear teeth 8 on the inner edge thereof, which teeth are in constant mesh with a pinion 9 mounted on a vertical shaft 10. Shaft 10 is driven in one direction by a continuously operating motor 11 and an associated gear reduction unit 12 through a clutch 13 and bevel gears 14 and 15. As described hereinafter, the turntable 4 is driven intermittently, and the clutch 13 is adapted to slip to enable stoppage of the turntable while the motor 11 continues to run. The clutch 13 is preferably a wet clutch and comprises a casing 16 containing oil, a pair of metal plates 17 and 18, and a friction disk 19 between said plates preferably formed of vulcanized fibre. Such clutch structure has been found to be very efficient and long lasting.

As may be seen in Fig. 3, the turntable 4 carries three molds 20, 21 and 22 arranged thereon in equally spaced angular relation. During a single complete revolution of the turntable, 4, it is stopped in three different positions. During each stoppage, a preforming operation takes place in one of the molds, a preform is ejected from a second mold, and the third mold is filled with material to be preformed. Thus, these three operations are preformed simultaneously during each stoppage of the turntable, and three preforms are produced during each revolution of the turntable.

The preforming operation is preformed by a double-acting cylinder and piston device 23 which is supported at the proper location by means of a plate 24 mounted on posts 25 which, in turn, are supported on the standard 5. The ejecting operation is performed by a smaller double-acting cylinder and piston device 26 which is suspended from a stationary plate 27 by means of supporting rods 28. The plate 27 also serves to support the rotatable turntable, as will be described presently. The filling operation, i. e. the placement in the molds of the material to be preformed, is performed by the operator.

In the illustration of Fig. 3, the turntable 4 is topped, the mold 20 is at the charging position or location, the mold 21 is at the molding position, and the mold 22 is at the ejecting position. During subsequent operation the charge in mold 20 is carried successively to the molding and ejecting positions.

The preforming and ejecting devices are hydraulically operated under control of the timing control mechanism 2. The details of the hydraulic system and the timing control device will be described later.

Referring more particularly to the structure thus far generally described, as shown in Fig. 5, the plate 27 is secured to standard 5 by means of screws 29, and this plate has a peripheral flange 30 within which the turntable 4 is rotatably disposed. A ring 31 is secured to the flange 30 by means of screws 32 and serves to retain the turntable in place. Each of the three molds carried by the turntable comprises a cylindrical cup 33 secured to the turntable by screws 34, and a centrally-located pin or core member 35 which is retained in place by the cup-shaped member 33. It will be seen that the pin 35 extends through the bottom of the cup-shaped member 33, and the two are formed as shown at 36 to effect the desired retention of the pin 35. Preferably, a plate 37 is provided as illustrated in order that the mold may be removed from the turntable whenever desired and may be readily replaced. The plate 37 is secured to the turntable by a screw 38 and one or more indexing pins 39, and this plate serves as a positive locating or indexing means for the mold.

The piston 23a of the preforming device 23 carries a tubular ram 40 which is adapted to enter each mold as shown. Within each mold, there is provided a movable ring 41 which is normally disposed at the bottom of the mold. Fig. 5 shows the preforming device during the preforming operation, the preform being shown at 42.

As shown at the right side of Fig. 5, the piston 26a of the ejecting device 26 carries a plate 43 on which are mounted a plurality of upwardly-extending pins 44. The upper ends of these pins are normally below the plate 27, as may be seen in Fig. 1, but during the ejecting operation, the pins are projected upwardly into the associated mold and they lift the ring 41, thus lifting the preform 42a. It will be seen that the plate 27 is formed to permit the upward projection of pins 44, and the turntable and the molds are provided with apertures 45 and 46 to accommodate the pins. With the preform 42a elevated as shown, it is a simple matter to remove it.

Stoppage of the turntable 4 in each of three positions during a complete revolution, as above mentioned, is effected by means of the detent mechanism shown in Figs. 5 and 6. The turntable is provided with three equally spaced recesses 47, one of which is visible in Fig. 6. The plate 27 has a projecting portion 48 which serves as a supporting guide for a detent member 49. To this end, the portion 48 has a slot-like recess 50 in which the detent member 49 is slidably disposed. The detent member has a projecting pin 51, the free end portion of which is slidable in an aperture 52 provided in the outer wall of portion 48. A helical spring 53 surrounds the pin 51 and urges the detent member 49 toward the turntable 4. When one of the turntable recesses 47 is adjacent the detent member 49, the projecting nose 54 of said member enters the recess, as shown in Fig. 6, thus stopping the turntable.

The detent member is removed from the turntable recess by an actuating mechanism associated with the preforming device 23, as shown in Fig. 5. A bell-crank lever 55 is rotatably supported on a pin 56 carried by bearing brackets 57 and 58. Arm 59 of the bell-crank lever extends into an opening 60 provided in the detent member 49. The other arm 61 of the bell-crank is bifurcated and is pivotally connected to one end of a link 62 which is preferably in the form of a turnbuckle. The other end of the link 62 is pivotally secured to a lever 63 which is pivotally mounted at 64 on a hanger 65 depending from plate 24. The lever 63 is arranged for actuation by an actuator 66 carried by the piston 23a of the preforming device 23. The said actuator is pivotally mounted at 67 on a projecting support 68. As may be seen in Fig. 5, the construction of these latter elements is such that the actuator is deflectible about its pivot in one direction only.

Normally, the actuator 66 is in the uppermost dotted position shown in Fig. 5, and the detent member 49 is free to stop the turntable as above described. Assuming that the turntable has been stopped, during the preforming operation the piston of device 23 moves downward and, as the actuator 66 engages the end of lever 63, the actuator is deflected as shown and has no effect upon the detent mechanism. After the preforming operation is completed, the piston of device 23 moves upward and the actuator 66 engages lever 63 and rocks the lever about its pivot as shown in Fig. 7. This causes withdrawal of detent member 49 from the turntable recess due to the operation of bell-crank 55 through the link 62. The turntable immediately resumes its rotation, the recess 47 moving out of alignment with the detent member 49.

Referring now to the hydraulic system for operating the preforming and ejecting devices, attention is again directed to Figs. 1 and 3 which illustrate the system. The arrangement is such that a relatively low hydraulic pressure is utilized to maintain the pistons of the preforming and ejecting devices in their inoperative positions, while a relatively high hydraulic pressure is utilized to actuate said devices. The pressures are preferably 350 pounds and 2,240 pounds, respectively. The low pressure main is shown at 69, while the high pressure main is shown at 70. A pipe or conduit 71 extends directly from the low pressure main 69 to branch conduits 72 and 73.

Conduit 72 extends to the bottom of the preforming device 23, while conduit 73 extends to the top of the ejecting device 26. Thus, the piston of device 23 is normally maintained in raised position, while the piston of device 26 is normally maintained in lowered position.

A multi-position rotary valve 74 is cyclically operated to control the operation of the said device. A conduit 75 extends from the high pressure main 70 to the valve 74, while a conduit 76 extends from the low pressure main to the valve. A conduit 77 extends from the valve to an exhaust main or conduit 78. A conduit 79 extends from the valve to branch conduits 80 and 81. Conduit 80 extends to the top of the preforming device 23, while conduit 81 extends to the bottom of the ejecting device 26. The rotary valve 74 is actuated through a shaft 82 on the end of which is a star wheel 83 (Fig. 8). The latter is actuated by a chain timer (Fig. 2) comprising an endless chain 84 and spaced sprockets 85 and 86. The chain carries rollers 87 which engage the radially-extending arms or fingers of the star wheel. The sprocket 86 is driven by a motor 88 through a gear reduction unit 89 which is operatively coupled to said motor through a chain drive 90. A manually-operable clutch 91 serves to couple the sprocket 85 to the driven shaft 92 extending from the gear reduction unit 89.

The valve 74 has four positions and the star wheel 83 correspondingly has four extending arms. These arms are actuated by the successive rollers 87 on the timer chain. In the specific apparatus illustrated, there are eight rollers on the timer chain. While it is possible to use only four rollers on the chain, the use of eight rollers enables a reduced speed of operation of the timing chain.

As shown in Figs. 1 and 3, the chain timer and the rotary valve may be mounted on a common supporting structure 93 in the form of a hollow casing composed of channel irons 94 and 95, and side plates 96 and 97. With this arrangement, the chain timer may be disposed within the upper part of said structure, as may be seen in Fig. 1, and the valve 74 may be mounted on one side of said structure.

The operation of the hydraulic system may be clearly understood by considering a complete cycle of operation thereof with particular reference to Fig. 1. In one position of the valve 74, conduit 79 is connected to exhaust so that the only pressure applied to the devices 23 and 26 is the low pressure applied through conduit 71. This low pressure maintains the piston of device 23 in the raised position, and it maintains the piston of device 26 in the lowered position.

In the next position of valve 74, conduit 79 is connected to conduit 76, thus applying low pressure to the top of device 23 and to the bottom of device 26. Since the upper face of the piston of device 23 is large in area compared to the lower face carrying the ram, the piston is moved downward into the associated mold. Likewise, since the lower face of the piston of device 26 is larger in area than the upper face, the piston is moved upward. Although the low pressure is not sufficient for completion of the preforming operation by device 23, it is sufficient for the ejecting operation of device 26. Consequently, the preform in the mold instantly associated with the ejecting device is moved upward by the pins 44.

In the next position of valve 74, the conduit 79 is connected to the high pressure conduit 75. The high pressure is transmitted to the ram 40 of device 23 to complete the preforming operation. While the high pressure is also applied to the bottom of device 26, it has no effect, unless, in any instance, the previously applied low pressure happened to be insufficient to cause the eject operation; in which case, the high pressure would be effective for that purpose.

In the next position of the valve 74, the conduit 79 is closed off, thus disconnecting the high pressure source from the device 23.

Finally, the valve 74 returns to the exhaust position in which the conduit 79 is connected to the exhaust conduit 77. This releases the high pressure, and the low pressure applied through conduit 71 is effective to return the pistons of devices 23 and 26 to their inoperative positions.

It will be seen from the foregoing description that the turntable 4 is intermittently driven by the continuously operating motor 11, while the hydraulic system is operated cylically through the continuous operation of the chain timer which is driven from the continuously operating motor 88. Thus, as long as the motor 88 continues to operate, the hydraulic pressure-applying system is operated through successive cycles by the timer and valve, without regard to the position of the turntable 4 at any particular time. It is important that the turntable be in proper position each time pressure is applied to the preforming and ejecting devices, as otherwise the pressure might cause damage to the apparatus. Accordingly, provision is made to test the position of the turntable just prior to the application of pressure, and to shut off the motor 88 in the event that the turntable is improperly positioned.

As shown in Figs. 3 and 4, a switch 98 is mounted in fixed position on plate 27, said switch being normally open and being closed by cam projections 99 carried by the turntable 4. There are three such cam projections, as shown in Fig. 3, arranged to close the switch 98 in each of the three positions in which the turntable is stopped. The switch 98 is actuated through an arm 100 which is pivotally connected to a bracket 101 carrying a roller 102. The bracket 101 is pivotally mounted at 103 on a support 104 depending from the switch casing.

Figure 9:
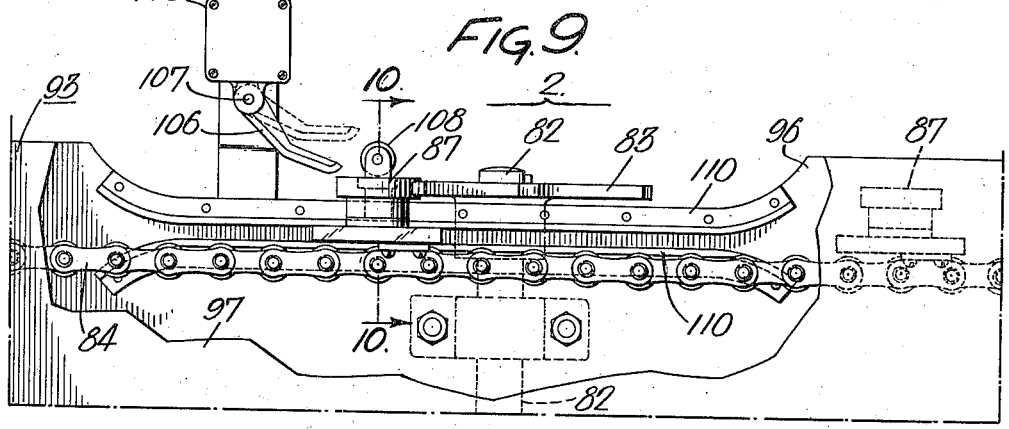
Fig. 9 is a side elevational view of the same.
Figure 10:
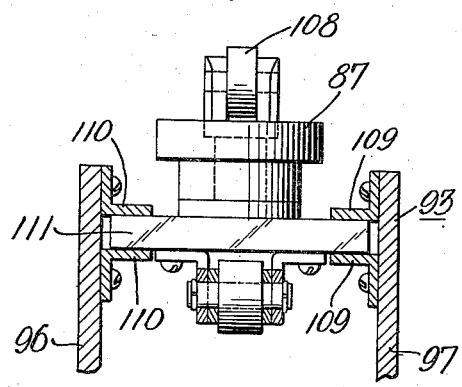
Fig. 10 is a sectional view taken along line 10—10 of Fig. 9.
Figure 11:
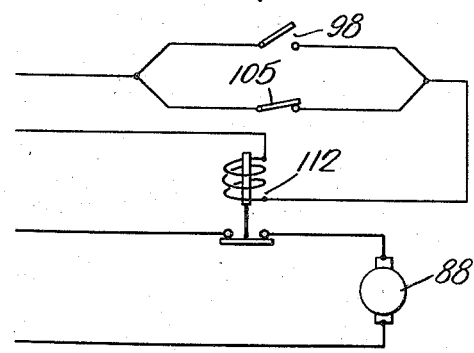
Fig. 11 is a diagrammatic illustration of the electrical control circuit.

As shown in Figs. 8 and 9, a second switch 105 is mounted on the support structure 93 in association with the chain timer. This switch is normally closed and it is actuated by a lever 106 pivoted at 107. The extending end portion of lever 106 is engageable by small rollers 108 provided on two (every fourth one) of the chain rollers 87, as may be seen in Fig. 2. In the vicinity of the star wheel 83 and the switch 105, there are provided supporting rails 109 and 110 (Figs. 8 to 10) which are mounted on the supporting structure 93. Each of the rollers 87 is supported on a carrier plate 111 which passes between and is supported by the guide rails, as may be seen in Fig. 10. Each of the rollers 108 opens the switch 105 during a short interval of time just prior to the actuation of valve 74 to the low pressure applying position. The two switches 98 and 105 are connected in shunt relation to one another, as shown in Fig. 11, in the energizing circuit of the starting contactor or relay 112 for the motor 88. At the time switch 105 opens, the turntable 4 should be stationary in one of its three stopped positions, and the switch 98 should be closed. In such event, the motor 88 continues to operate. However, if the turntable is not exactly in proper position, the switch 98 will not be closed when switch 105 is opened. In such event, the starting contactor or relay 112 will be deenergized, thus opening the circuit of motor and stopping the chain 84. Consequently, the valve 73 will not be actuated to apply pressure to the preforming and ejecting devices. When the turntable is properly positioned, the switch 98 is closed and the motor 88 is again energized.

As previously mentioned, the apparatus provided by the invention is particularly useful in the preforming of gear web portions composed of macerated resin-impregnated fibrous material. However, the apparatus is applicable to the preforming of any desired object. In practice, it has been found that the apparatus is easily capable of producing three preforms per minute. Moreover, it requires only a single operator who has only to fill one of the molds and remove the ejected preform during each period of stoppage of the turntable.

It should be noted further that the apparatus is capable of cold preforming or molding of an object and it is thus employed in the preforming of the web portions of fibre gears. However, the apparatus is also adapted for hot preforming or molding of objects whenever desired.

While the apparatus illustrated and described constitutes a preferred embodiment of the invention, it will be understood that the invention is not limited thereto but is capable of various modifications and other physical embodiments.

I claim:

1. Apparatus for preforming objects of moldable material, comprising a turntable adapted to carry a charge of said material from a charging or loading position to a molding position and thence to an ejecting position, all during a single revolution of said turntable, fluid pressure-operable molding means at said molding position operable to preform said charge into the desired object, fluid pressure-operable ejecting means at said ejecting position operable to eject the preformed object from said turntable, means for driving said turntable, means for automatically stopping said turntable temporarily in three successive positions during each revolution of the turntable to permit the aforementioned operations, means for supplying activating pressurized fluid to said molding means and said ejecting means, a valve for controlling the supply of the activating pressurized fluid, a star wheel connected to said valve to actuate the same, power-driven timing means adapted to actuate said star wheel so as to cyclically operate said valve, and means for testing the position of said turntable just prior to the supply of the activating pressurized fluid to said molding means and said ejecting means, and for stopping said timing means in the event of improper synchronization between said timing means and said turntable.

2. Apparatus for preforming objects of moldable material, comprising a turntable adapted to carry a charge of said material from a charging or loading position to a molding position and thence to an ejecting position, all during a single revolution of said turntable, molding means at said molding position operable to preform said charge into the desired object, ejecting means at said ejecting position operable to eject the preformed object from said turntable, means for driving said turntable, means for automatically stopping said turntable temporarily in three successive positions during each revolution of the turntable to permit the aforementioned operations, means including a movable timing member for effecting timed operation of said molding means and said ejecting means, an electric motor arranged to drive said timing member, a normally-open switch arranged to be closed by said turntable when the latter is properly positioned in each of the aforementioned three positions during each revolution of the turntable, and a normally-closed switch arranged to be opened by said timing member at the times when said first switch should be closed, said switches being connected in a control circuit for said motor in parallel relation with one another so as to open said circuit in the event of improper synchronization between said timing member and said turntable, thus preventing operation of said molding means and said ejecting means.

3. Apparatus for preforming objects of moldable material, comprising a turntable adapted to carry a charge of said material from a charging or loading position to a molding position and thence to an ejecting position, all during a single revolution of said turntable, molding means at said molding position operable to preform said charge into the desired object, ejecting means at said ejecting position operable to eject the preformed object from said turntable, a continuously operable driving motor for said turntable, a driving connection including a slip clutch between said motor and said turntable, means for stopping said turntable temporarily in three successive positions during each revolution of the turntable to permit the aforementioned operations, said clutch permitting the stoppage of the turntable while its driving motor continues to operate, means for effecting timed operation of said molding means and said ejecting means, and means for testing the position of said turntable just prior to the operation of said molding means and said ejecting means, and for preventing the operation of the latter two means in the event of improper synchronization between said last-recited means and said turntable.

4. Apparatus for preforming objects of moldable material, comprising a turntable adapted to carry a charge of said material from a charging or loading position to a molding position and then to an ejecting position, all during a single revolution of said turntable, fluid pressure-operable molding means at said molding position operable to preform said charge into the desired object, fluid pressure-operable ejecting means at said ejecting position operable to eject the preformed object from said turntable, a continuously operable driving motor for said turntable, a driving connection including a slip clutch between said motor and said turntable, means for stopping said turntable temporarily in three successive positions during each revolution of the turntable to permit the aforementioned operations, said clutch permitting the stoppage of the turntable while its driving motor continues to operate, means for effecting timed operation of said molding means and said ejecting means, and means for testing the position of said turntable just prior to the operation of said molding means and said ejecting means, and for preventing the operation of the latter two means in the event of improper synchronization between said last-recited means and said turntable.

5. Apparatus for preforming objects of moldable material, comprising a turntable adapted to carry a charge of said material from a charging or loading position to a molding position and thence to an ejecting position, all during a single revolution of said turntable, fluid pressure-operable molding means at said molding position operable to preform said charge into the desired object, fluid pressure-operable ejecting means at said ejecting position operable to eject the preformed object from said turntable, a continuously operable driving motor for said turntable, a driving connection including a slip clutch between said motor and said turntable, means for stopping said turntable temporarily in three successive positions during each revolution of the turntable to permit the aforementioned operations, said clutch permitting the stoppage of the turntable while its driving motor continues to operate, means for supplying activating pressurized fluid to said molding means and said ejecting means, valve means for controlling the supply of the activating pressurized fluid, power-driven timing means for cyclically operating said valve means, and means for testing the position of said turntable just prior to the supply of the activating pressurized fluid to said molding means and said ejecting means, and for stopping said timing means in the event of improper synchronization between said timing means and said turntable.

6. Apparatus for preforming objects of moldable material, comprising a turntable adapted to carry a charge of said material from a charging or loading position to a molding position and thence to an ejecting position, all during a single revolution of said turntable, fluid pressure-operable molding means at said molding position operable to preform said charge into the desired object, fluid pressure-operable ejecting means at said ejecting position operable to eject the preformed object from said turntable, a continuously operable driving motor for said turntable, a driving connection including a slip clutch between said motor and said turntable, means for stopping said turntable temporarily in three successive positions during each revolution of the turntable to permit the aforementioned operations, said clutch permitting the stoppage of the turntable while its driving motor continues to operate, means for supplying activating pressurized fluid to said molding means and said ejecting means, a valve for controlling the supply of the activating pressurized fluid, a star wheel connected to said valve to actuate the same, power-driven timing means adapted to actuate said star wheel so as to cyclically operate said valve, and means for testing the position of said turntable just prior to the supply of the activating pressurized fluid to said molding means and said ejecting means, and for stopping said timing means in the event of improper synchronization between said timing means and said turntable.

7. Apparatus for preforming objects of moldable material, comprising a turntable adapted to carry a charge of said material from a charging or loading position to a molding position and thence to an ejecting position, all during a single revolution of said turntable, molding means at said molding position operable to preform said charge into the desired object, ejecting means at said ejecting position operable to eject the preformed object from said turntable, a continuously operable driving motor for said turntable, a driving connection including a slip clutch between said motor and said turntable, means for stopping said turntable temporarily in three successive positions during each revolution of the turntable to permit the afore- mentioned operations, means including a movable timing member for effecting timed operation of said molding means and said ejecting means, an electric motor arranged to drive said timing member, a normally-open switch arranged to be closed by said turntable when the latter is properly positioned in each of the aforementioned three positions during each revolution of the turntable, and a normally-closed switch arranged to be opened by said timing member at the times when said first switch should be closed, said switches being connected in a control circuit for said last-named motor in parallel relation with one another so as to open said circuit in the event of improper synchronization between said timing member and said turntable, thus preventing operation of said molding means and said ejecting means.

8. In an apparatus for forming objects of moldable material, a movable member adapted to carry a charge of said material from a charging or loading position to a molding position, molding means at said molding position operable to form said charge into an object, continuously operable means for actuating said member, a driving connecting including a slip clutch between said actuating means and said member, means for stopping said member temporarily to permit the molding operation, said clutch permitting the stoppage of said member while its actuating means continues to operate, means for effecting timed operation of said molding means, and means for testing the position of said member just prior to the operation of said molding means, and for preventing the operation of said molding means in the event of improper synchronization between said last-recited means and said member.

9. In an apparatus for forming objects of moldable material, a movable member adapted to carry a charge of said material from a charging or loading position to a molding position, molding means at said molding position operable to form said charge into an object, continuously operable means for actuating said member, a driving connection including a slip clutch between said actuating means and said member, means for stopping said member temporarily to permit the molding operation, said clutch permitting the stoppage of said member while its actuating means continues to operate, independently operable means including a movable timing member for effecting timed operation of said molding means, and means for testing the position of said first member just prior to the operation of said molding means, and for stopping said timing member in the event of improper synchronization between said timing member and said first member.

10. In an apparatus for forming objects of moldable material, a movable member adapted to carry a charge of said material from a charging or loading position to a molding position, molding means at said molding position operable to form said charge into an object, means for actuating said member, means for automatically stopping said member temporarily to permit the molding operation, means including a movable timing member for effecting timed operation of said molding means, an electric motor arranged to drive said timing member, a normally-open switch arranged to be closed by said first member when the latter is in the molding position, and a normally-closed switch arranged to be opened by said timing member at a time when said first switch should be closed, said switches being connected in a control circuit for said motor in parallel relation with one another so as to open said circuit in the event of improper synchronization between said timing member and said first member, thus preventing operation of said molding means.

11. In an apparatus for forming objects of moldable material, a turntable adapted to carry a charge of said material from a charging or loading position to a molding position, molding means at said molding position operable to form said charge into an object, means for driving said turntable, means for automatically stopping said turntable temporarily to permit the molding operation, means including a movable timing member for effecting timed operation of said molding means, an electric motor arranged to drive said timing member, a normally-open switch arranged to be closed by said turntable when the latter is in the molding position, and a normally-closed switch arranged to be opened by said timing member at a time when said first switch should be closed, said switches being connected in a control circuit for said motor in parallel relation with one another so as to open said circuit in the event of improper synchronization between said timing member and said turntable, thus preventing operation of said molding means.

12. In an apparatus for forming objects of moldable material, a turntable adapted to carry a charge of said material from a charging or loading position to a molding position, molding means at said molding position operable to form said charge into an object, a continuously operable driving motor for said turntable, a driving connection including a slip clutch between said motor and said turntable, means for stopping said turntable temporarily to permit the molding operation, said clutch permitting the stoppage of the turntable while its driving motor continues to operate, means including a movable timing member for effecting timed operation of said molding means, an electric motor arranged to drive said timing member, a normally-open switch arranged to be closed by said turntable when the latter is in the molding position, and a normally-closed switch arranged to be opened by said timing member at a time when said first switch should be closed, said switches being connected in a control circuit for said motor in parallel relation with one another so as to open said circuit in the event of improper synchronization between said timing member and said turntable, thus preventing operation of said molding means.

13. In an apparatus for forming objects of moldable material, a movable member adapted to carry a charge of said material from a charging or loading position to a molding position, fluid pressure-operable molding means at said molding position operable to form said charge into an object, means for actuating said member, means for automatically stopping said member temporarily to permit the molding operation, means for supplying activating pressurized fluid to said molding means, a valve for controlling the supply of said fluid to said molding means, a star wheel connected to said valve to actuate the same, power-driven timing means adapted to actuate said star wheel so as to cyclically operate said valve, and means for testing the position of said member just prior to the supply of the activating pressurized fluid to said molding means, and for stopping said timing means in the event of improper synchronization between said timing means and said member.

14. In an apparatus for forming objects of moldable material, a movable member adapted to carry a charge of said material from a charging or loading position to a molding position, fluid pressure-operable molding means at said molding position operable to form said charge into an object, continuously operable means for actuating said member, a driving connection including a slip clutch between said actuating means and said member, means for stopping said member temporarily to permit the molding operation, said clutch permitting the stoppage of said member while its actuating means continues to operate, means for supplying activating pressurized fluid to said molding means, a valve for controlling the supply of said fluid to said molding means, a star wheel connected to said valve to actuate the same, power-driven timing means adapted to actuate said star wheel so as to cyclically operate said valve, and means for testing the position of said member just prior to the supply of the activating pressurized fluid to said molding means, and for stopping said timing means in the event of improper synchronization between said timing means and said member.

15. In an apparatus for forming objects of moldable material, a movable member adapted to carry a charge of said material from a charging or loading position to a molding position, fluid pressure-operable molding means at said molding position operable to form said charge into an object, means for actuating said member, means for automatically stopping said member temporarily to permit the molding operation, means for supplying activating pressurized fluid to said molding means, a valve for controlling the supply of said fluid to said molding means, a star wheel connected to said valve to actuate the same, a movable timing member for actuating said star wheel so as to cyclically operate said valve, an electric motor arranged to drive said timing member, a normally-open switch arranged to be closed by said first member when the latter is in the molding position, and a normally-closed switch arranged to be opened by said timing member at a time when said first switch should be closed, said switches being connected in a control circuit for said motor in parallel relation with one another so as to open said circuit in the event of improper synchronization between said timing member and said first member, thus preventing operation of said molding means.

FRANK H. BENGE.

REFERENCES CITED

The following references are of record in the file of this patent:

UNITED STATES PATENTS

| Number | Name | Date |
|---|---|---|
| 1,517,364 | Keny | Dec. 2, 1924 |
| 1,641,922 | Davis | Sept. 6, 1927 |
| 2,111,857 | Jeffery | Mar. 22, 1938 |
| 2,333,056 | Thoreson et al. | Oct. 26, 1943 |
| 2,333,059 | Tucker | Oct. 26, 1943 |